United States Patent [19]

Camacho et al.

[11] Patent Number: 4,654,076

[45] Date of Patent: Mar. 31, 1987

[54] APPARATUS AND METHOD FOR TREATING METALLIC FINES

[75] Inventors: Salvador L. Camacho; Jack L. Dochterman; Richard D. Lindsay, all of Raleigh, N.C.

[73] Assignee: Plasma Energy Corporation, Raleigh, N.C.

[21] Appl. No.: 824,220

[22] Filed: Jan. 30, 1986

[51] Int. Cl.$^4$ ............................ C22B 4/00; B23K 9/00
[52] U.S. Cl. ............................ 75/10.19; 219/121 P; 266/200; 373/24
[58] Field of Search ............................ 75/10–12; 219/121 P; 373/24; 266/200

[56] References Cited

U.S. PATENT DOCUMENTS

| | | | |
|---|---|---|---|
| 2,038,251 | 4/1936 | Vogt | 148/1 |
| 3,342,250 | 9/1967 | Treppschuh | 75/10 R |
| 3,496,280 | 2/1970 | Dukelow et al. | 13/9 |
| 3,936,589 | 2/1976 | Tylko | 219/121 P |
| 4,022,872 | 5/1977 | Carson et al. | 204/164 |
| 4,105,888 | 8/1978 | Fey | 75/10 R |
| 4,169,962 | 10/1979 | Hiratake et al. | 13/1 |
| 4,177,060 | 12/1979 | Tylko | 75/10 R |
| 4,214,736 | 7/1980 | Wolf et al. | 13/9 R |
| 4,217,479 | 8/1980 | Borer et al. | 219/121 P |
| 4,341,915 | 7/1982 | Adachi et al. | 373/22 |
| 4,396,421 | 8/1983 | Stift | 75/11 |
| 4,468,008 | 8/1984 | Primke et al. | 266/99 |

Primary Examiner—Peter D. Rosenberg
Attorney, Agent, or Firm—Bell, Seltzer, Park & Gibson

[57] ABSTRACT

As apparatus and method is disclosed which is adapted to melt metallic fines, and which is useful for processing metallic fines into a useful form. The apparatus may also be used in the smelting of metallic oxides, and in combining metals in an alloying process. The disclosed embodiment of the apparatus includes a furnace having a hearth, a pair of tubular residence chambers each extending upwardly from the hearth, a first plasma torch mounted at the upper end of each residence chamber, and a second plasma torch mounted for heating the material on the hearth. The powdered or granular material is fed into the upper end of each residence chamber, such that the material is at least partially melted from the heat of the first torch while falling through the residence chamber, and the material is further heated and completely melted on the hearth by the second torch. Where smelting is performed, a granular metallic oxide and a granular reductant such as carbon is introduced into the residence chambers, so that the heat of the first torches causes the reduction of the metallic oxide. Where alloying of the metal being treated is desired, there is provided a portal in the wall of the furnace for permitting scrap or other metallic material to be fed directly to the hearth.

19 Claims, 5 Drawing Figures

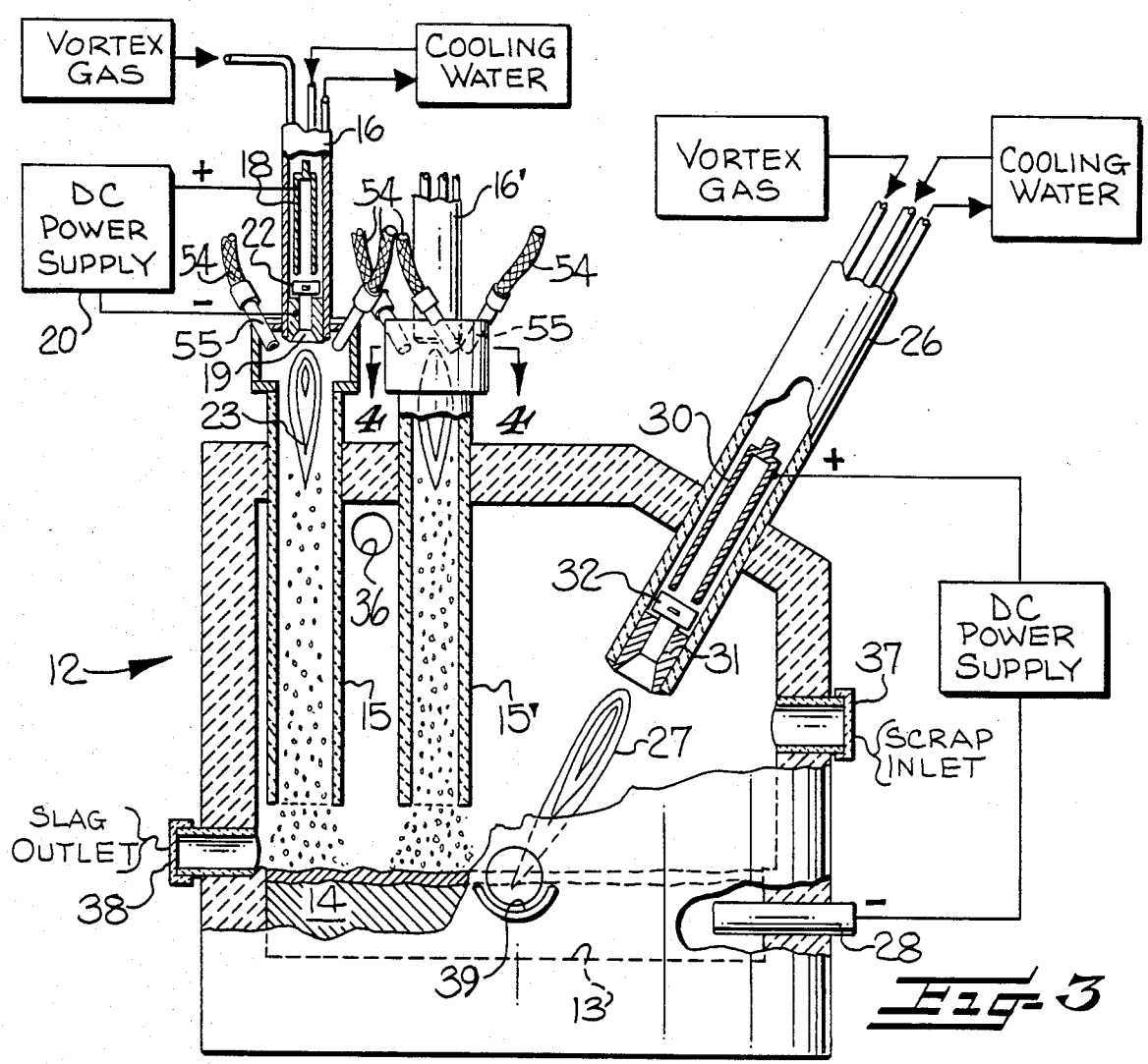
FIG-3
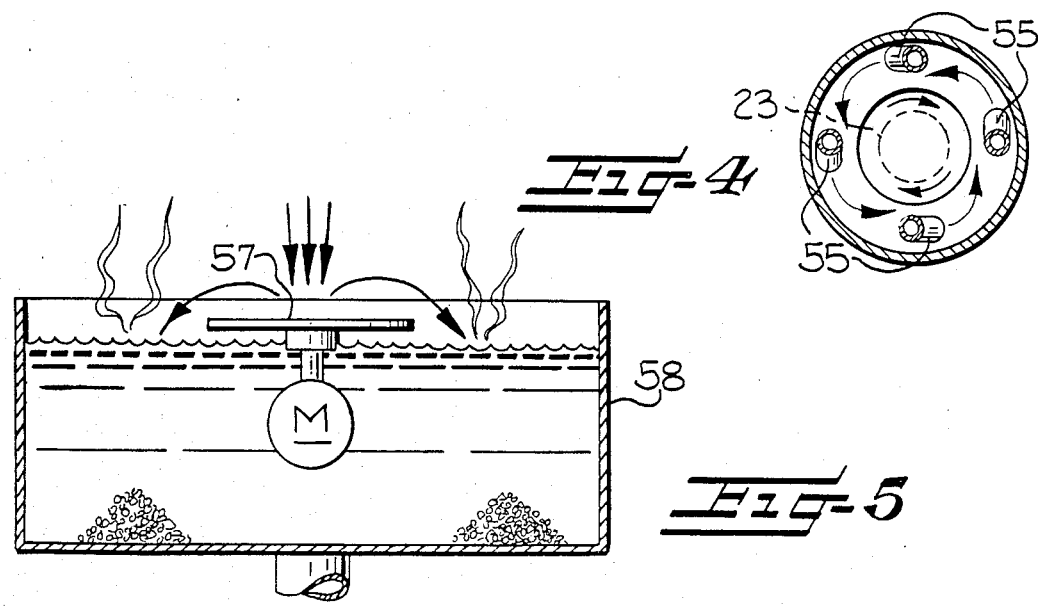
FIG-4
FIG-5

APPARATUS AND METHOD FOR TREATING METALLIC FINES

The present invention relates to an apparatus and method for treating a powdered or granular metallic material, such as metallic fines, by heating and melting the material to form a melt thereof, and which serves to convert the material into a useful form. The invention is also useful in smelting and combining metals to form an alloy of desired composition.

In the processing of metallic ores, a powdered or granular material, usually referred to as fines, is often produced as a byproduct. Thus for example, iron ore is commonly subjected to a "beneficiation" process, wherein the ore is subjected to a mechanical separation process to concentrate the ore. This process results in the production of large amounts of iron containing fines. Such metallic fines cannot be reprocessed in conventional furnaces by heating and melting, since the fines are highly reactive and may even explode when subjected to heat. Also, the fines tend to be carried away with the exhaust of the furnace, and a large portion is thus lost. As a result, metallic fines are not presently reprocessed, and are treated as waste. This not only results in the loss of a significant volume of the metal, but in addition, present disposal methods often result in the fines polluting the environment.

It is accordingly an object of the present invention to provide an apparatus and method for economically treating metallic fines so as to recover the metal in a useful form.

It is a more particular object of the present invention to provide an apparatus and method for heating and melting metallic fines, and which overcomes the tendency of the fines to explosively react when subjected to heat, as well as the tendency to be carried away with the exhaust gas.

It is also an object of the present invention to provide an apparatus and method for heating, melting, and smelting metallic oxides, and which is also adapted to have other metals added to the melted metal and so as to produce a desired alloy.

These and other objects and advantages of the present invention are achieved in the embodiment illustrated herein by the provision of an apparatus and method which includes a furnace having a hearth adapted to support a melt bath, a tubular residence chamber mounted to the furnace and extending upwardly above the hearth, a first plasma arc torch mounted at the upper end of the residence chamber for directing a plasma column into the upper end of the chamber, and a second plasma arc torch mounted for directing a second plasma column onto the hearth. Means are also provided for feeding a powdered or granular material, such as metallic fines, into the upper end of the residence chamber, such that the material is at least partially melted from the heat of the plasma column of the first torch while falling through the residence chamber and onto the melt bath. The material is further heated and melted on the hearth by the second plasma torch to form the desired melt.

Preferably, the powdered or granular material is entrained in a gas stream, which is directed into the upper end of the residence chamber. Also, the plasma column of the first torch includes a vortical flow of arc gas, and the gas stream and entrained material entering the upper end of the residence chamber preferably includes a tangential component which serves to substantially cancel the torque of the vortical flow of gas associated with the plasma column of the first torch. As a result, the fines fall in an essentially vertical path through the residence chamber and onto the underlying bath, and the partially melted fines tend to "stick" in the bath to prevent their being carried away with the exhaust gases of the furnace.

It is also preferred that the furnace be mounted for pivotal movement, and that the furnace include a pour spout communicating with the hearth, such that the melt in the hearth may be periodically withdrawn by pivoting the furnace so that the melt runs out through the spout. The melt may be poured into molds to form ingots, but as an alternative, a horizontally disposed and rotating spray plate may be disposed below the pour spout, so that the poured melt is formed into a spray of droplets by the rotating spray plate, and the droplets are then collected in an underlying water tank to form the same into solidified globular particles.

Some of the objects and advantages of the present invention having been stated, others will appear as the description proceeds when taken in conjunction with the accompanying generally schematic drawings, in which FIG. 1 is a perspective view of an apparatus for treating a powdered or granular material in accordance with the present invention;

FIG. 3 is a sectional view of the furnace shown in FIG. 1;

FIG. 4 is a sectional view taken substantially along the line 4—4 of FIG. 3 and illustrating the direction in which the material is fed with respect to the vortical flow of gas in the plasma column; and FIG. 5 is a sectional view of the water bath and taken substantially along the line 5—5 of FIG. 1.

Figures 1, 2:
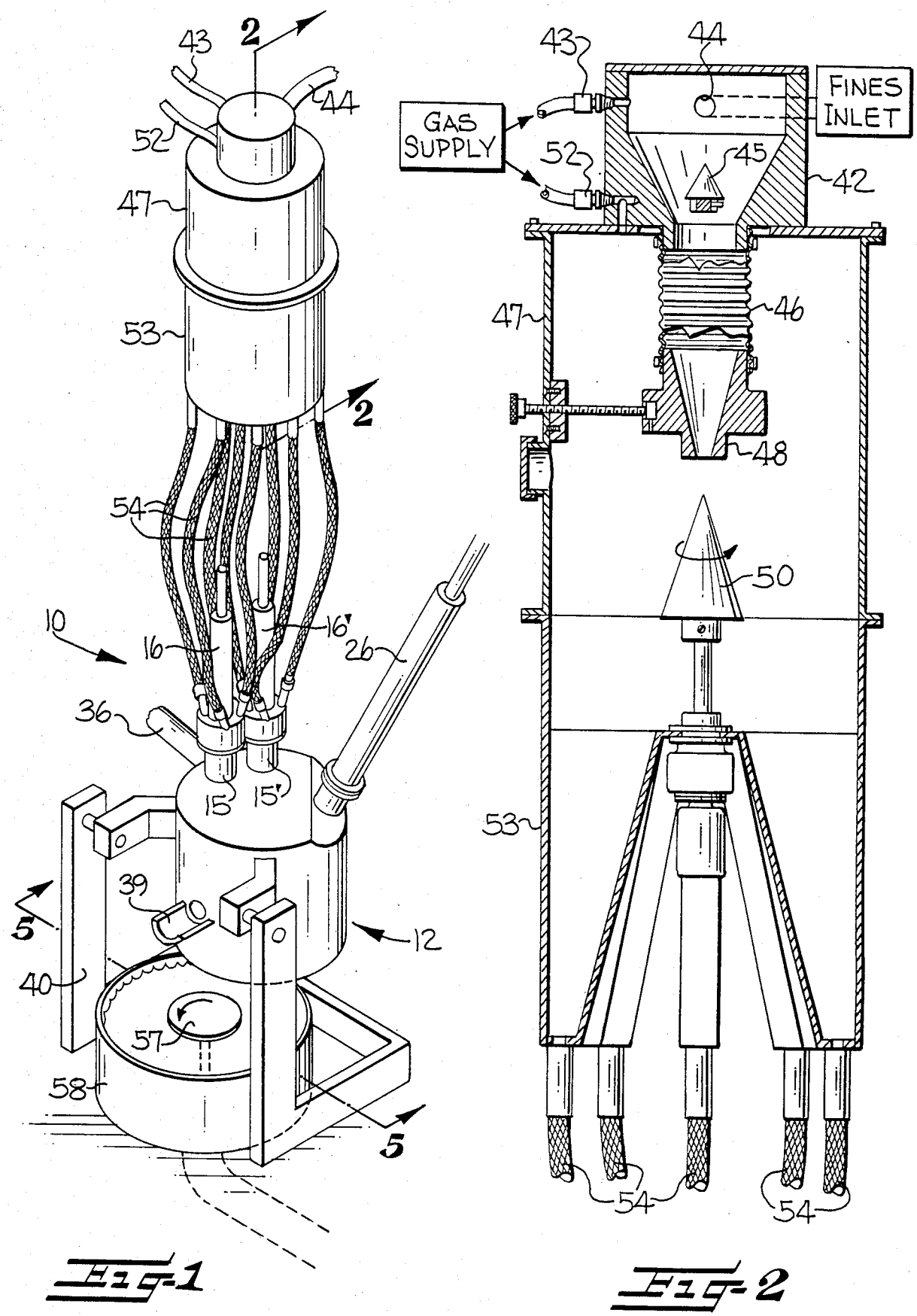
FIG. 2 is a sectional view of the material feeding portion of the apparatus shown in FIG. 1.

Referring more particularly to the drawings, FIG. 1 illustrates a preferred embodiment of an apparatus 10 which is adapted for heating and melting powdered or granular material, such as metallic fines, in accordance with the present invention. The illustrated embodiment of the apparatus 10 includes a furnace 12 having an internal hearth 13 adapted to support a melt bath 14, and two tubular and cylindrical residence chambers 15, 15' which are mounted so as to extend vertically upwardly from the hearth and through the top wall of the furnace. The residence chambers are formed of a suitable heat resistant material, such as silicon nitride.

A pair of plasma arc torches 16, 16' are mounted adjacent respective ones of the upper ends of the residence chambers, and with the torches being in coaxial alignment with the associated chamber. The torches 16, 16' are of known design, and each includes a rear electrode 18, a coaxially aligned front electrode 19, and direct current power supply means 20 for operating the torch in a nontransferable arc mode wherein the arc extends between the rear and front electrodes. Each torch also includes a gas vortex generating chamber 22 positioned between the electrodes for forming a vortical flow of gas which serves to closely collimate the arc. In operation, each torch produces a plasma column 23 which extends coaxially into the upper end of the associated residence chamber, and the column includes a vortical gas flow component produced by the gas vortex generating chamber of the torch, and as indicated schematically in FIG. 4.

The furnace 12 further includes another plasma arc torch 26 mounted in the wall of the furnace for directing a plasma column 27 onto the bath 14 in the hearth 13 at an angle from the horizontal of about 60°. The furnace also includes a graphite electrode 28 mounted adjacent the hearth so as to contact the melt bath 14, and the torch 26 includes a rear electrode 30, a coaxially aligned collimator 31, gas vortex generating chamber 32 positioned between the rear electrode and collimator, and direct current power supply means 33 operatively connected to the electrode 30 for operating the torch in a transfer arc mode wherein the arc extends from the rear electrode 30 through the collimator 31 and to the melt bath 14 and electrode 28.

The furnace 12 also includes a gas exhaust port 36, and an inlet port 37 for permitting scrap or other material to be fed directly to the hearth. The exhaust port 36 is preferably mounted adjacent the upper ends of the residence chambers 15, 15' as best seen in FIG. 3, so that the circulating hot gases in the furnace pass along the chambers and keep them hot. The furnace also includes a slag outlet port 38 and a pour spout 39 in the side wall of the furnace, and which communicate with the hearth. The furnace is mounted to a supporting frame 40 for pivotal movement about a horizontal axis, and such that the melt bath in the hearth may be periodically withdrawn by pivoting the furnace so that the melt runs out through the pour spout 39.

The apparatus of the present invention also includes means for continuously feeding a powdered or granular material into the upper end of each residence chamber, and such that the material is at least partially melted from the heat of the plasma column while falling through the residence chamber and onto the hearth. The material in the hearth is further heated and melted by the plasma column of the torch 26, to form the melt bath in the hearth. The feeding means is positioned above the furnace to take advantage of gravity flow, and includes a first or upper chamber 42 adapted to continuously receive a gas stream through the inlet 43 and a supply of the powdered or granular material through the inlet 44. The material and gas stream pass vertically downwardly past a fixed mixing cone 45 and then through a vertical chute 46 and into an intermediate chamber 47. The chute 46 includes a laterally adjustable funneling nozzle 48 for directing the material and gas against a rotating cone 50, to thereby further facilitate mixing. Additional gas is introduced into the intermediate chamber 47 through the second gas inlet 52, and the material and gas then pass downwardly to a distribution chamber 53, wherein the gas and entrained material are distributed into eight flexible tubes 54, with four of the tubes leading to each of the two residence chambers 15, 15'. Each of the tubes 54 terminates in a nozzle 55, with the nozzles being oriented as illustrated in FIG. 4, so that the gas stream and entrained material is introduced into the residence chamber so as to have a component in a tangential direction with respect to the plasma column 23, and which is opposite to the vortical flow of gas from the associated torch.

The apparatus of the present invention further includes water bath means positioned below the pour spout when the furnace is pivoted, for receiving the melt and forming the same into solidified globular particles of relatively large size. The water bath means includes a horizontally disposed and rotating spray plate 57 upon which the melt is poured, so that a radiating spray of individual droplets is formed. A water tank 58 underlies the spray plate for receiving the spray of droplets so as to cool and solidify the same.

In operation, a powdered or granular material to be treated, such as metallic fines, is delivered through the inlet 44 to the upper chamber 42 of the feeding means. The material is mixed with the gas entering through the inlet 43, and passes downwardly through the chute 46 to the intermediate chamber 47 where it is mixed with the additional gas entering through the inlet 52. The gas and entrained material is then distributed to the individual delivery tubes 54, and injected into one of the residence chambers 15, 15' essentially tangentially and in opposed relationship with respect to the vortical flow of gas in the plasma column 23. By proper coordination of the mass flow rate of the gas and entrained material, the torque of the vortex gas may be substantially cancelled, so that the material drops vertically through the residence chamber without being thrown to the side walls of the chamber by the vortical flow of the arc gas in the plasma column. Heat transfer to the material is thus facilitated.

In passing downwardly through the residence chamber, 15, 15', the individual particles of the material are heated to a degree sufficient to at least partially melt or agglomerize the material. As a result, the wet or agglomerized particles will tend to "stick" in the bath 14 being formed in the hearth 13, and thus will not tend to be exhausted through the gas exhaust port 36 of the furnace. The torch 26, which is operated in the transfer arc mode, serves to complete the heating and melting of the material while it is in the hearth, and form a melt bath. Periodically, the furnace 12 is pivoted to pour the melt onto the rotating spray plate 57, so as to form a spray of radiating droplets, which are collected in the underlying water tank 58 where they cool and solidify. The melt is thereby formed into readily usable and relatively large globular particles.

The apparatus of the present invention is also adapted to smelt metallic oxides, and to combine metals in an alloying process. As a specific example, the apparatus may be employed to smelt beryllium oxide, and then alloy the resulting beryllium with copper. More particularly, beryllium ore ($BeO_2$) may be initially crushed to make beryllium fines, which is introduced into the inlet 44 of the feed chamber along with a predetermined quantity of carbon (graphite) fines. The gas introduced into the feed chamber should be an inert gas, such as argon or nitrogen, so as to avoid the introduction of oxygen. As a result, the beryllium oxide and carbon react upon passing through the residence chambers 15, 15' to produce elemental beryllium and carbon monoxide, with the beryllium being collected as the melt 14 in the hearth and the carbon monoxide being exhausted as a gas through the outlet 36. In addition, a predetermined quantity of scrap copper would be added directly to the hearth through the port 37, so that the copper is melted in the hearth and alloyed with the beryllium. The resulting alloy melt could be poured directly into ingots, or poured onto the rotating spray plate 57 to form globular particles in the water tank 58 in the manner described above.

As another specific example, powdered or granular iron ore ($Fe_2O_3$) together with a predetermined quantity of powdered or granular carbon may be fed into the residence chambers 15, 15', and so that the heat of the plasma arc columns 23 at least partially melts the iron ore and reduces at least a substantial portion of the iron ore to form elemental iron and gaseous carbon monoxide. As a further step, a second metal may be added through the port 37 directly onto the hearth, and so that the second metal is melted by the heat of the second plasma arc column 27 and is mixed with the melted iron to form an alloy of the two metals.

In the drawings and specification, there has been set forth a preferred embodiment of the invention, and although specific terms are employed, they are used in a generic and descriptive sense only and not for purposes of limitation.

That which is claimed is:

1. An apparatus for heating and melting a powdered or granular material to form a melt thereof, and comprising a furnace having a hearth adapted to support a melt bath, at least one tubular residence chamber mounted to said furnace and extending upwardly above said hearth, a first plasma arc torch mounted at the upper end of said one residence chamber for directing a plasma column into said upper end, a second plasma arc torch mounted to said furnace for directing a plasma column onto said hearth, and means for continuously feeding a gas stream and entrained powdered or granular material into the upper end of said one residence chamber, such that the material is at least partially melted from the heat of the plasma column of said first torch while falling through said residence chamber and onto said hearth, and whereby the material is further heated and melted by the plasma column of said second plasma arc torch to form a melt bath in said hearth.

2. The apparatus as defined in claim 1 wherein said means for feeding a gas stream and entrained material into said residence chamber includes means for entraining the material in a gas stream and such that the gas stream and entrained material are fed into the upper end of said chamber.

3. The apparatus as defined in claim 2 wherein said first torch includes gas vortex generating means for forming a vortical flow of a gas serving to closely collimate the arc thereof.

4. The apparatus as defined in claim 3 wherein said first torch is oriented so that its plasma column is directed axially into the upper end of said chamber, and said means for entraining the material in a gas stream includes means for introducing the gas stream and entrained material into said chamber in a direction having a component opposite the vortical flow of gas from said first torch and so as to substantially cancel the torque of said vortical flow of gas.

5. The apparatus as defined in claim 4 wherein said first torch includes a rear electrode, a coaxially aligned front electrode, and power supply means for operating said first torch in a non-transfer arc mode wherein the arc extends between said rear and front electrodes.

6. The apparatus as defined in claim 5 wherein said furnace further includes a hearth electrode mounted so as to contact the melt bath supported in said hearth, and wherein said second torch includes a rear electrode, a coaxially aligned collimator, and power supply means operatively connected to said hearth electrode for operating said second torch in a transfer arc mode wherein the arc extends from said rear electrode through said collimator and to said melt bath and said hearth electrode.

7. The apparatus as defined in claim 1 wherein said furnace is mounted for pivotal movement and includes a pour spout communicating with said hearth, and whereby the melt bath in said hearth may be periodically withdrawn by pivoting the furnace so that the melt runs out through said pour spout.

8. The apparatus as defined in claim 7 further including water bath means positioned below said pour spout when said furnace is pivoted, for receiving the melt and forming the same into solidified globular particles.

9. The apparatus as defined in claim 8 wherein said water bath means includes a horizontally disposed and rotating spray plate upon which the melt is adapted to be poured to form a spray of individual droplets, and a water tank underlying the spray plate for receiving the spray of droplets from the plate so as to cool and solidify the same.

10. The apparatus as defined in claim 1 wherein said means for feeding a material into the upper end of said residence chamber includes feed chamber means positioned above said furnace for entraining the powdered or granular material into a gas stream while mixing the same, and feeding the gas stream and entrained material vertically downwardly to the upper end of said residence chamber.

11. The apparatus as defined in claim 1 wherein said furnace further includes port means for permitting scrap or other material to be fed directly to said hearth.

12. An apparatus for heating and melting a powdered or granular material to form a melt thereof, and comprising a furnace having a hearth adapted to support a melt bath, a pair of like tubular residence chambers mounted to said furnace and extending vertically upwardly above said hearth, a first plasma arc torch mounted at the upper end of each of said residence chambers for directing a plasma column into the upper end thereof, a second plasma arc torch mounted to said furnace for directing a plasma column onto said hearth, and means for continuously feeding a gas stream and entrained powdered or granular material into the upper end of each of said residence chambers, such that the material is at least partially melted from the heat of the plasma column of the associated first torch while falling through a residence chamber and onto said hearth, and whereby the material is further heated and melted by the plasma column of said second plasma arc torch to form a melt bath in said hearth.

13. A method for heating and melting a powdered or granular material to form a melt thereof, and comprising the steps of feeding a gas stream and entrained powdered or granular material through a vertically directed tubular residence chamber, while heating the same with a first plasma arc column so as to at least partially melt the material, and collecting the at least partially melted material on a hearth positioned below said residence chamber, while heating the material on the hearth with a second plasma arc column so as to form a melt bath of the material.

14. The method as defined in claim 13 wherein the step of feeding the gas stream and entrained material through a residence chamber comprises entraining the material in a gas stream, and then directing the gas stream and entrained material into the upper end of said residence chamber.

15. The method as defined in claim 14 wherein the first plasma arc column includes a vortical flow of gas, and wherein the step of directing the gas stream and entrained material into the upper end of said residence chamber includes orienting the gas stream and entrained material in a direction having a component opposite the vortical flow of gas from said first plasma arc column and so as to substantially cancel the torque of said vortical flow of gas.

16. The method as defined in claim 13 comprising the further step of adding a second material directly onto the hearth, and so that the second material is melted by the heat of said second plasma arc column and mixes with the melt of said first mentioned material.

17. The method as defined in claim 13 comprising the further step of pouring the melt from the hearth onto a rotating spray plate to form a spray of droplets, and collecting the spray of droplets in a water tank to form the same into solidified globular particles.

18. A method for heating, melting, and smelting a powdered or granular metallic oxide to form a melt of the elemental metal, and comprising the steps of feeding a gas stream and entrained powdered or granular metallic oxide together with a predetermined quantity of powdered or granular carbon through a vertically directed tubular residence chamber, while heating the same with a first plasma arc column so as to at least partially melt the metal oxide and reduce at least a substantial portion of the metal oxide to form the elemental metal and gaseous carbon oxide, and collecting the at least partially melted metal on hearth positioned below said residence chamber, while heating the metal on the hearth with a second plasma arc column so as to form a melt bath of the material.

19. The method as defined in claim 18 comprising the further step of adding a second metal directly onto the hearth, and so that the second metal is melted by the heat of said second plasma arc column and mixes with the melt of the first mentioned metal to form an alloy.

* * * * *